P. O. NAVARRE.
MACHINE FOR REMOVING THE STALKS FROM FRUITS.
APPLICATION FILED JULY 16, 1921.

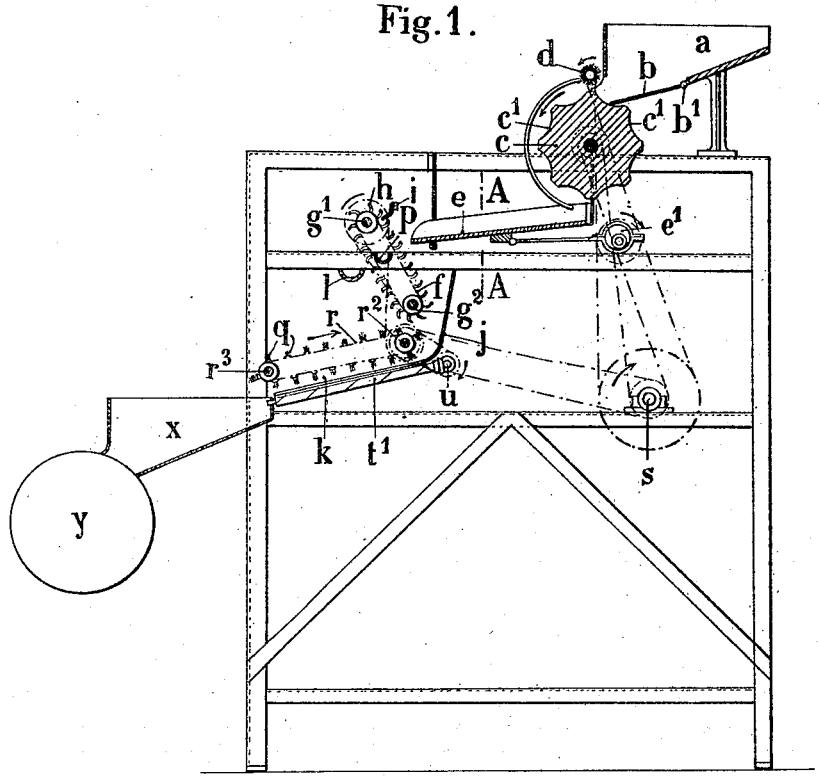
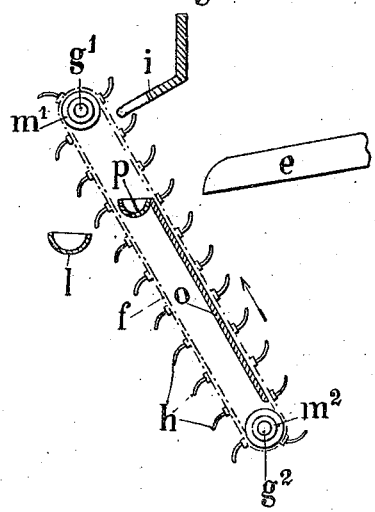
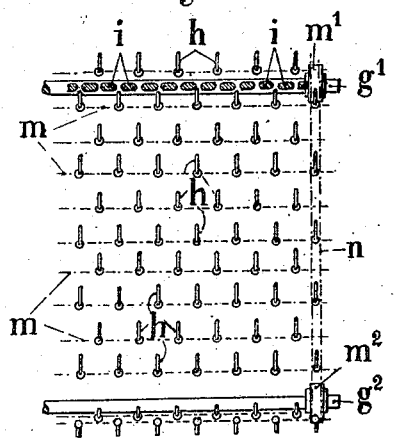

1,414,889. Patented May 2, 1922.

INVENTOR
PLACIDE OSCAR NAVARRE
BY
ATTORNEYS

UNITED STATES PATENT OFFICE.

PLACIDE OSCAR NAVARRE, OF PARIS, FRANCE.

MACHINE FOR REMOVING THE STALKS FROM FRUITS.

1,414,889.	Specification of Letters Patent.	Patented May 2, 1922.

Application filed July 16, 1921. Serial No. 485,285.

*To all whom it may concern:*

Be it known that I, PLACIDE OSCAR NAVARRE, of 56 Avenue de Chatillon, Paris, France, have invented a Machine for Removing the Stalks from Fruits, of which the following is a full, clear, and exact description.

This inventon relates to a machine for automatically removing the stalks from cherries and other fruits, which operation is usually effected by hand.

This machine essentially comprises:

(a) A special system of distribution;

(b) A stalk removing system for the bunches. In fact it frequently happens that, particularly for cherries, several stalks are connected together;

(c) A stalk removing system for the non-connected cherries or other fruits.

The system of distribution is characterized by the combination of a cylinder provided with recesses adapted to receive the fruits and of a hinged shutter, forming a portion of the bottom of the feeding hopper, the free edge of which constantly remains in contact with the cylinder, thus preventing any crushing of the fruits. A brush parallel to the cylinder controls the quantity of fruits admitted in each of the above mentioned recesses. The device is completed by a vibrating frame uniformly dividing the fruits for distributing them to the succeeding devices.

The stalk removing device for the bunches consists substantially in hooks arranged on an endless apron, or carried by a chain on which hooks fall astride the cherries, discharged by the vibrating frame, the said hooks bringing the cherries to combs which separate the fruits from the stalks, which are separately collected.

The stalk removing device for the independent fruits comprises small troughs, slightly inclined in the bottom of which is formed a longitudinal slot in which the stalks can engage; brushes arranged above the said troughs cause the fruits to move forward by rolling them, so that the stalks are forced to pass in the slots, where they are grasped by rolls arranged under the trough and which pull them off.

In order that the invention may be clearly understood, the new machine is diagrammatically illustrated in the accompanying drawing in which:

Fig. 1 is a view of the machine.

Fig. 3 is a section, on an enlarged scale of the stalk removing device for the bunches.

Fig. 4 is a corresponding side view.

Figure 2:
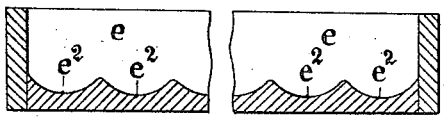
Fig. 2 is a section of a detail, made according to line A—A of Fig. 1.

As shown in the drawing, Fig. 1, the machine first comprises a system of distribution composed of a hopper $a$ with an inclined bottom, a part $b$ of which is hinged at $b^1$. The free end of this hinged part or shutter rests on the periphery of a rotating distributing cylinder $c$ provided with longitudinal recesses $c^1$. The profile of these recesses and the position of the axis $b^1$ are such that the free edge of the part $b$ is constantly in contact with the cylinder. In this manner the fruits cannot pass between the cylinder and the shutter and therefore the fruits cannot be crushed or lost.

Above the cylinder is arranged a brush $d$, rotating as indicated by the arrow; this brush is mounted in supports having slide-ways (not shown) so that this brush can be raised or lowered. According to the size of the recesses, the position of the brush and the speed the output of the feeding device may be controlled.

The fruits fall from a cylinder $c$ upon a vibrating frame $e$ to which is imparted a rather rapid reciprocating movement and controlled by an eccentric shaft $e^1$; this frame is mounted on suspension springs or in any other suitable manner.

The purpose of this frame $e$ is to uniformly distribute the fruits. Its bottom may be smooth, perforated, or provided with V-shaped grooves or, corrugation $e^2$ parallely arranged to the length of the frame, as shown in Fig. 2. In case this stalk removing device for the bunches would not be necessary, this grooved frame might discharge the fruits in the corresponding grooves or troughs where the stalks are removed from the independent fruits, as will be described hereafter.

Figure 5:
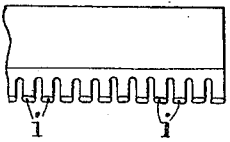
Fig. 5 is a detail view.

The stalk removing device for the bunches is constituted by an inclined endless cloth passing on two shafts $g^1$ and $g^2$ and carrying hooks $h$ of suitable shape, arranged at suitable intervals from each other and having rounded ends so as not to deteriorate the fruits. Opposite the hooks are arranged fixed combs $i$ (Fig. 5).

The fruits issuing from the frame $e$ fall upon this cloth $f$; those which are not connected together pass between the hooks and, guided by an apron $j$ (Fig. 1) fall in the stalk removing troughs $k$ described hereafter.

The fruits which are connected in pairs or more, are retained by the hooks $h$; the latter draw them along with them in their upward movement and lead them to the combs $i$ which bear on the fruits suspended from the hooks and detach them from their stalks. The latter disengage from the hooks during the downward movement of the cloth and fall in a conduit $l$ which leads them away.

Instead of mounting the hooks $h$ on a cloth, as just mentioned, they can be secured on transverse bars $m$, diagrammatically illustrated in Fig. 4, carried by chains $n$ winding on pinions $m^1$, $m^2$ mounted on the shafts $g^1$, $g^2$. For instance, the shaft $g^1$ may be the driven shaft and may carry the pinions keyed on the same, whilst the other pinions may be loosely mounted on the shaft $g^2$.

A partition $o$ is arranged up to a certain height in the discharge zone of the fruits falling from the frame $e$.

In these conditions, the fruits, the stalks of which have been removed by the combs $i$, pass in the empty space existing above this partition $o$ and directly fall in a conduit $p$, having a suitable slope, which leads them to the exterior.

In this manner the cherries the stalks of which have been removed by the combs $i$ cannot mix with the cherries the stalks of which are to be removed in the troughs $k$, described hereafter, thus allowing to increase the output of the machine.

These troughs $k$, adapted to remove the stalks from the fruits not connected in bunches, are inclined as shown in Fig. 1. Their number depends on the output which it is desired to obtain from the machine. The said troughs have at their lower part a slot $k^1$ (Fig. 7) extending throughout their length and adapted to give passage to the stalks of the fruits, but retaining the latter. For cherries, for instance, these slots will have a width of about one centimetre.

Above each trough and parallel thereto move brushes $q$ of suitable length, flexibility and suitably spaced apart; these brushes are mounted on endless chains $r$ carried by pinions $r^1$ mounted on shafts $r^2$ $r^3$. One of them, viz. $r^2$ may be driven by the main shaft $s$ (Fig. 1).

These brushes sweep the bottom of each trough, drive along and roll the fruits in such a manner that the stalks are forced to pass through the lower slot.

Under each trough and very near the same are arranged two parallel rotary rolls $t^1$ $t^2$. One of the rolls is driven for instance by means of pinions $u^1$, $u^2$, the latter rigidly mounted on a shaft $u$ actuated by the main shaft through the medium of the shaft $r^2$. The other roll is forced against the preceding one with an adjustable pressure. The two rolls may also be pressed against each other by means of springs. They may also be independently driven.

The stalks of the fruits which pass through the slots $k^1$ are grasped by the rolls $t^1$ $t^2$ and pulled off. The fruits are retained in the troughs and led to the end of the latter by the combined action of the brushes and of the slope.

The rolls $t^1$ $t^2$ can be covered with rubber or with a rubberized coating, or they can present a metallic working surface. They can be smooth or corrugated, or present asperities of various shape for the purpose of ensuring a positive grip on the stalks to be pulled off. One of them or both may be provided with a projecting spiral rib $v$ for facilitating the pulling off action.

The fruits free from their stalks fall in a hopper $x$ which leads them to the machines $y$ for removing the stones (Fig. 1).

In Fig. 1 it has been supposed that $s$ was the main shaft and was driving the cylinder $c$, brush $d$, shaft $e^1$, shaft $r^2$ of the brushes and through the latter the shaft $g^1$ of the hooks $h$ and the shaft $u$ of the pulling off rolls through chains or belts or any other arrangement.

According to the nature of the fruits and to special circumstances, the machine may comprise all or a part of the above described groups of members.

Figure 6:
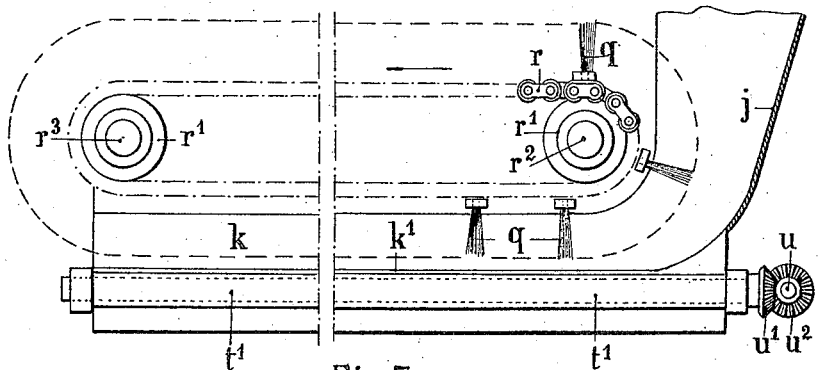
Figs. 6, 7 and 8 illustrate in elevation, cross-section and plan view the stalk removing device for the separate fruits.
Figure 7:
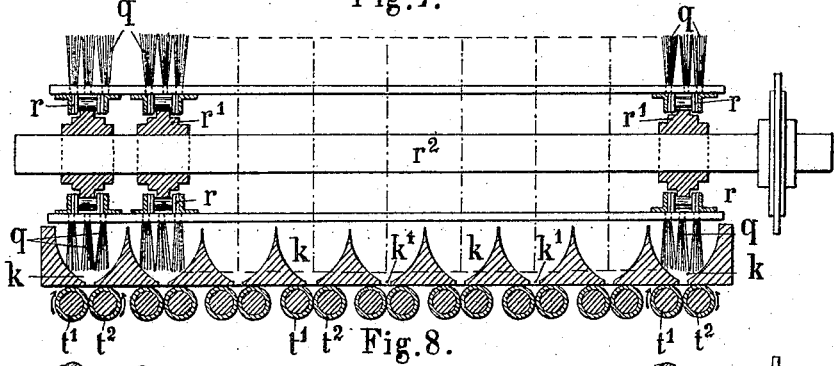
Figure 8:
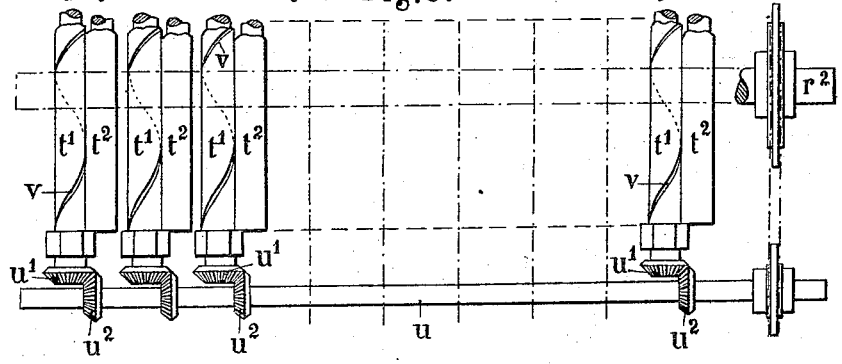

Thus for instance the stalk removing device shown in Figs. 6 to 8 being capable of removing the stalks even from fruits connected in bunches, the pulling off device of Figs. 3, 4 and 5 is not indispensable. However, its use ensures better results and a more reliable operation.

The above arrangements are given by way of example only; the forms, dimensions, materials used and all detail arrangements may be varied according to circumstances without departing thereby from the principle of the said invention.

Claims:

1. In a machine for removing the stalks from fruits, a feeding hopper, fixed inclined troughs having slots in their bottoms, means below the troughs for pulling off the stalks and brushes over the troughs and running the entire length of the same, said brushes turning the fruit and moving it along the troughs.

2. In a machine for removing the stalks from fruit, a feeding hopper, fixed inclined troughs having slots in their bottoms, means for pulling off the stalks extending through the slots, and endless chains of brushes, one for each trough.

3. In a machine for removing the stalks from fruits, a feeding device, parallel troughs, means for leading the fruits to these troughs, slots in the bottom of the said troughs, rolls for pulling off the stalks extending through and below these slots, brushes forming an endless chain for causing the fruits to move forward in the troughs.

4. In a machine for removing the stalks from fruits, a feeding hopper, a cylinder with longitudinal recesses constituting a device for measuring the quantities of fruits, a hinged hopper bottom the free edge of which rests on the cylinder, a stalk removing device receiving the fruits in the necessary quantity through the said cylinder.

5. In a machine for removing the stalks from fruits, a feeding hopper, a cylinder with longitudinal recesses constituting a device for measuring the quantities of fruits, a hinged hopper bottom the free edge of which rests on the cylinder, a rotary brush limiting the quantities of fruits contained in each recess of the cylinder, a stalk removing device receiving the fruits in the necessary quantity through the said cylinder.

6. In a machine for removing the stalks from fruits, a feeding hopper, a cylinder with longitudinal recesses, a hinged hopper bottom resting on the cylinder, means for feeding the fruits from the said cylinder to the stalk removing device, a device adapted to mechanically pull off the stalks of the fruits.

7. In a machine for removing the stalks from fruits, a feeding hopper, a cylinder with longitudinal recesses, a hinged hopper bottom resting on the cylinder, an inclined vibrating frame, a device adapted to mechanically pull off the stalks of the fruits.

8. In a machine for removing the stalks from fruits, a feeding hopper, a cylinder with longitudinal recesses, a hinged hopper bottom resting on the cylinder, troughs receiving the fruits, slots in the bottom of the troughs, rolls under the slots for pulling off the stalks, a device adapted to mechanically pull off the stalks of the fruits.

9. In a machine for removing the stalks from fruits, a feeding device, an endless chain upon which fall the fruits, hooks carried by the chain and retaining the fruits connected in bunches, combs stopping the fruits and separating them from the stalks, a conduit for the pulled off stalks.

10. In a machine for removing the stalks from fruits, a feeding device, an endless chain upon which fall the fruits, hooks carried by the chain and retaining the fruits connected in bunches, combs stopping the fruits and separating them from the stalks, a conduit for the pulled off stalks, a partition in the discharge zone and interrupted above the same, a receiving conduit for the fruits, arranged under the interrupted part of the partition.

11. In a machine for removing the stalks from fruits, a feeding device, means for pulling off the stalks of fruits connected in bunches, means for pulling off the stalks of independent fruits.

12. In a machine for removing the stalks from fruits, a feeding device, an endless chain upon which fall the fruits, hooks carried by the chain and retaining the fruits connected in bunches, combs stopping the fruits and separating them from the stalks, a conduit for the pulled off stalks, slotted troughs receiving the independent fruits, pulling off rolls arranged under the slots.

13. In a machine for removing the stalks from fruits, a hopper with a hinged bottom, a cylinder with longitudinal recesses, an endless chain upon which fall the fruits, hooks retaining the fruits connected in bunches, pulling off combs for these fruits, slotted troughs receiving the independent fruits and pulling off rolls under these slots.

The foregoing specification of my machine for removing the stalks from fruits, signed by me this 27th day of June 1921.

PLACIDE OSCAR NAVARRE.